(12) United States Patent
Kent

(10) Patent No.: US 8,308,091 B2
(45) Date of Patent: Nov. 13, 2012

(54) OFFSET BLADE GRATER

(75) Inventor: Joseph Kent, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 276 days.

(21) Appl. No.: 12/898,580

(22) Filed: Oct. 5, 2010

(65) Prior Publication Data

US 2012/0080548 A1    Apr. 5, 2012

(51) Int. Cl.
*A47J 43/25* (2006.01)
(52) U.S. Cl. ........................................ 241/95; 241/273.1
(58) Field of Classification Search .................... 241/95, 241/273.1–273.4
See application file for complete search history.

(56) References Cited

U.S. PATENT DOCUMENTS

| | | | |
|---|---|---|---|
| 2,482,180 A | 9/1949 | Heard | |
| 2,505,114 A | 4/1950 | Hayman et al. | |
| 3,583,455 A | 6/1971 | Ostrowsky | |
| 3,610,304 A | 10/1971 | Popeil | |
| D227,534 S | 7/1973 | Hutzler | |
| D259,759 S | 7/1981 | Williams | |
| 5,100,506 A | 3/1992 | Sturtevant et al. | |
| D337,491 S | 7/1993 | So | |
| 6,135,375 A | 10/2000 | Kaposi et al. | |
| D438,433 S | 3/2001 | Kaposi et al. | |
| 6,409,107 B1 | 6/2002 | Romano | |
| 6,860,441 B2 | 3/2005 | Richardson | |
| 7,469,848 B2 * | 12/2008 | Yamanaka et al. | 241/95 |
| D625,969 S | 10/2010 | McGuyer et al. | |
| 2008/0190304 A1 | 8/2008 | Sawhney et al. | |
| 2010/0140212 A1 | 6/2010 | Li | |

FOREIGN PATENT DOCUMENTS

| | | |
|---|---|---|
| DE | 178171 | 9/1935 |
| GB | 2048023 | 10/1995 |
| GB | 2335841 | 10/1999 |
| GR | 871808 | 7/1987 |

* cited by examiner

*Primary Examiner* — Mark Rosenbaum
(74) *Attorney, Agent, or Firm* — Lowe Graham Jones PLLC

(57) ABSTRACT

A food grater having an improved cutting surface in which cutting teeth are configured with cutting edges that are inclined in alternating directions. In various embodiments, the cutting surface is incorporated into a hand-held, box, pyramid, or other grater.

16 Claims, 3 Drawing Sheets

OFFSET BLADE GRATER

FIELD OF THE INVENTION

This invention relates generally to food graters.

BACKGROUND OF THE INVENTION

There are many different food graters on the market. In most cases, such graters have a planar or curved cutting surface with a plurality of blades formed on the cutting surface. The blades extend outward from the surface in order to scrape away a portion of the food item. By including many blades in close proximity to one another, the food item can be shredded by dragging the food item over the cutting surface.

Unfortunately, with graters that are currently on the market the blades tend to pull the food item toward one side or the other rather than vertically straight down the cutting surface. This pull makes for a less efficient grating process as a part of the food item is pulled out of contact with the cutting surface. It also makes grating more work as the user must exert more force to work against this sideways pull

SUMMARY OF THE INVENTION

The present invention comprises a food grater having an improved cutting surface in which cutting teeth are configured to prevent or reduce the sideways pull against a food item as it travels along the cutting surface.

In the preferred version as shown, the blades are formed in rows having a plurality of blades or teeth in each row. The cutting edges of the blades along a first row are angled along a first orientation with respect to the line defining the horizontal row of blades, while the cutting edges of the blades along a second row are angled along a second orientation with respect to the line defining the horizontal row of blades. In this fashion, in preferred examples of the invention the cutting tooth edges alternate from one row to the next.

In accordance with the preferred examples of the graters as described below, the grater improves the ability of the user to push a food item straight down the cutting surface.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
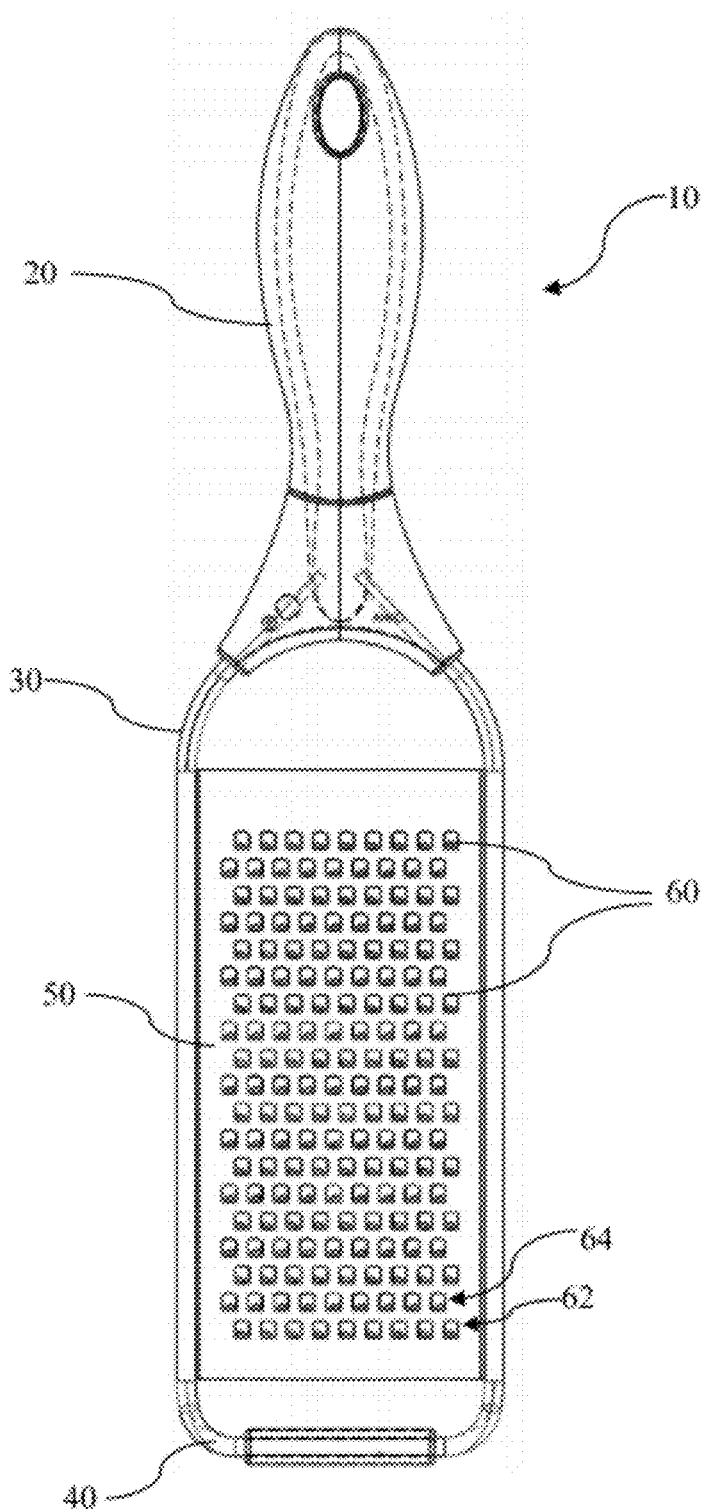
FIG. 1 is a top plan view of a preferred hand-held version of a grater.

An exemplary food grater 10 is illustrated in FIG. 1 as having a grip or handle 20 secured to a wire frame having a proximal end 30 and a distal end 40. The wire frame supports a cutting surface 50 having a plurality of blades or teeth 60 arranged in rows, e.g., 62, 64.

In an alternate version of a grater (not shown) formed in accordance with this invention, the grater includes a plurality of cutting surfaces forming sidewalls that are inclined inwardly from a base to a handle to form a generally pyramidal shape having an interior space defined by the sidewalls. The sidewalls may optionally taper to form a triangular or trapezoidal shape at each side, as may be desired. Alternatively, the sidewalls may be substantially vertical to form a box. In addition, a grater in accordance with the present invention may have any number of sides. A preferred version of the pyramidal type includes three or four sidewalls.

The present invention concerns the nature of the teeth and the cutting surface, and therefore the description will address the version of the invention as illustrated in FIG. 1. It should be understood, however, that the teeth and cutting surface as described below may be incorporated into any type of grating structure.

Figure 4:
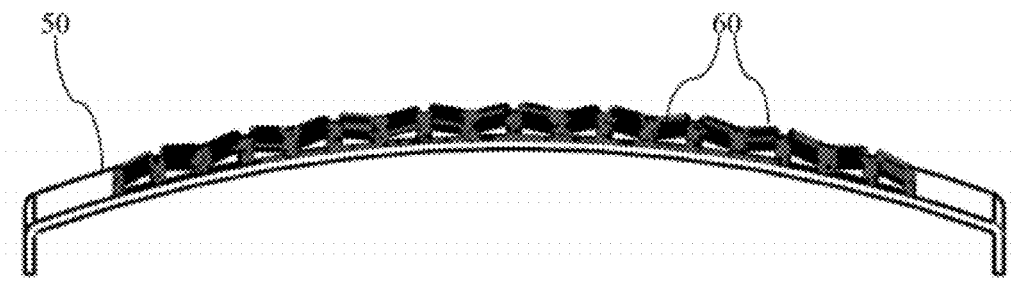
FIG. 4 is an end view of the cutting surface of FIG. 2.

The hand-held grater of FIG. 1 may have a planar cutting surface or, in the version as shown and as best seen in the top view of FIG. 4, may have a cutting surface 50 that is convex or bowed outwardly.

Each version of the grater includes a cutting surface having a plurality of blades or teeth 60 that are arranged in a plurality of rows, e.g., 62, 64. The rows are preferably substantially linear and oriented to be parallel to one another and orthogonal to a path of travel of a food item to be grated by the grater. In the exemplary version of FIG. 1, the rows are orthogonal to an axis extending from the handle 20 to the distal end 40 of the frame.

Figure 2:
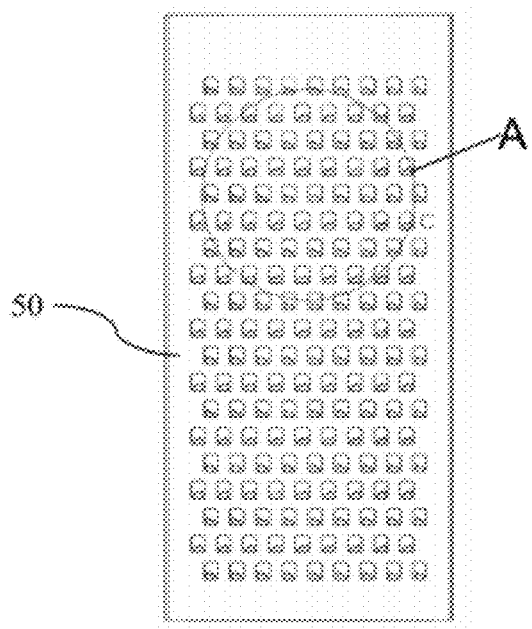
FIG. 2 is a plan view of a cutting surface in accordance with a preferred grater.

FIG. 2 shows a view of a cutting surface 50 that is separated from a handle and frame. In this view, the cutting surface is represented as being rectangular in shape, though it may alternatively be triangular, trapezoidal, or otherwise shaped. In addition, the cutting surface may be flat or planar, or otherwise shaped. Likewise, the cutting surface 50 of FIGS. 2 and 3 may be secured to a box or pyramid grater, a hand-held grater, or any other form of grater.

As noted above, the cutting surface 50 may be substantially planar, or may alternatively be bowed or convex in shape. In the case of a convex cutting surface, the curvature of a preferred cutting surface is best seen in FIG. 4, which is an end view of the cutting surface of FIG. 2. Alternatively, the end view may reflect a cutting surface that is planar, rather than bowed (not shown).

Figure 3:
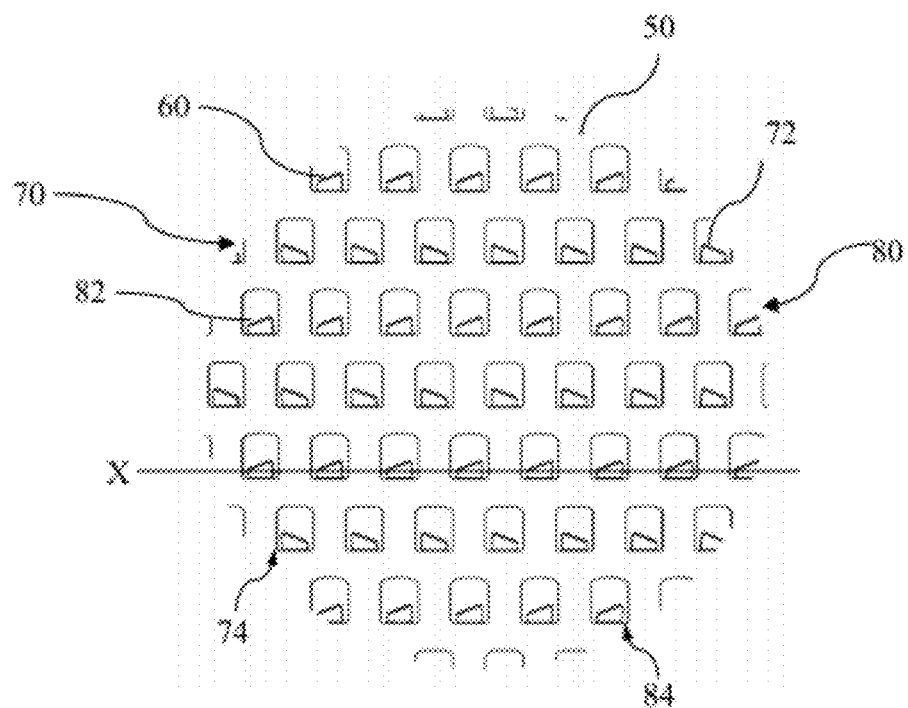
FIG. 3 is a close-up view of Detail A as indicated in FIG. 2.

FIG. 3 illustrates the close-up view of Detail A taken from FIG. 2. In FIG. 3, the shapes and configuration of the preferred cutting teeth are shown. The cutting surface 60 is formed with several rows (e.g., 70, 80) of cutting teeth 60. Any number of rows may be used, and preferably the rows are formed from a plurality of teeth in each row, with adjacent rows being parallel to one another. In the example as shown, each row is also perpendicular to a preferred path of travel of a food item being grated, with the path of travel also being in the direction from the proximal end to the distal end of the cutting surface.

Figure 5:
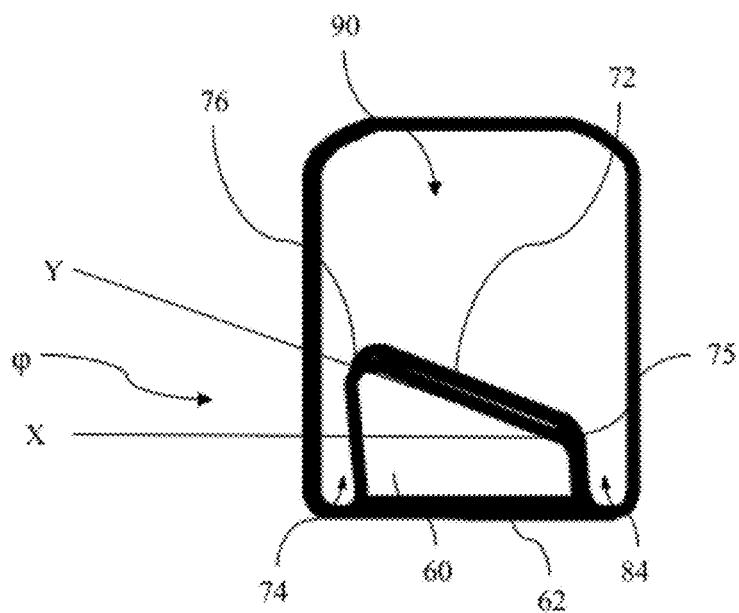
FIG. 5 is a front view of an exemplary tooth in accordance with the present invention.

The cutting surface includes a first row of blades 70 having a first plurality of teeth 60. Each of the teeth in the first row includes a sharpened edge 72 that is configured for cutting the food item. The sharpened edges preferably are not formed to be parallel with the line defining the row of teeth, but rather are angled with respect to the line defined by the row of teeth. As best seen in FIGS. 3 and 5, a first line X passes through the base of each tooth within a row. Accordingly, the teeth within the row define the line X.

Each tooth 60 includes a base at the bottom of the opening defining the tooth, the tooth extending upwardly from the base and terminating in the sharpened edge 72. The sharpened edge is inclined with respect to the first line X, and therefore non-parallel to the first line X. As shown in FIG. 5, a second line Y passes through a first corner 75 and a second corner 76 of the tooth 60, with the sharpened edge preferably extending linearly from the first corner to the second corner. Even where the sharpened edge is jagged or otherwise not perfectly linear, the line Y defines a best fit or close approximation of the general path taken by the edge as it progresses from the first corner 75 to the second corner 76.

Because the sharpened edge of the tooth is non-parallel with the line defined by the row (that is, it is angularly offset), the sharpened edge is at an angle, φ, which is defined as the angle between lines X and Y. In the particular example tooth shown in FIG. 5, the sharpened edge is angularly offset such that the first corner is below the second corner, meaning that the first side of the tooth is shorter than the second side. Alternate teeth may reverse this orientation such that the second side is shorter than the first side.

Preferably, the angular offset, φ, is about 20 degrees. In alternate version the angular offset is 30 degrees, 40 degrees, or 45 degrees. In yet other version the angular offset is 10 degrees or smaller, but most preferably the angular offset is at least about 20 degrees to accomplish the linear pull in accordance with the invention.

The preferred version of the invention includes rows formed by pluralities of teeth in which each row has teeth with alternating angular offsets. Thus, as best seen in FIG. 3, a first row 70 includes a plurality of teeth 72 having a first angular offset with respect to a horizontal line defined by the alignment of the row. A second row 80 includes a second plurality of teeth 82 having a second angular offset with respect to the horizontal line. Most preferably the first angular offset is equal but opposite to the second angular offset. In other words, the first angular offset is defined by an angle φ above the horizontal line X while the second angular offset is defined by the same angle φ below the horizontal line X. Where both the first angular offset and second angular offset are measured as an angle defined above the line X, the first angular offset would be measured from the line X and following a clockwise arc to the line Y, while the second angular offset would be measured from the opposite end of the line X and following a counterclockwise arc to the line Y.

In accordance with a preferred method of manufacturing the cutting surface, the method begins with a metal blank 50 substantially in the shape as shown in FIG. 2. The metal blank is planar in the initial step, and in a preferred example the blank is substantially rectangular in shape. The blank may alternatively be formed as a triangle, trapezoid, or other shape as noted above.

The manufacturing process then forms a plurality of openings 90 in the blank that define a plurality of rows, each of the plurality of rows having a plurality of openings. In one version of the invention, the openings are formed by a stamping process that punches chads from the metal blank, leaving the openings 90. In an alternate version of the invention, the openings are formed by etching the metal blank by masking the blank other than in the areas forming the openings and then subjecting the blank to a solution that will etch away the metal in the region of the openings 90. The etching process is used in the preferred version in order to form a sharper cutting edge of the blade.

The opening 90 forming the tooth preferably further includes a pair of channels 74, 84 extending down the sides of the tooth and thereby defining the side edges of the tooth. In accordance with the description above, the first channel 74 is longer than the second channel 84 in order to form the angularly offset sharpened tooth edge.

The tooth 60 further includes a base 62 that extends generally between the lowest edges of the channels 74, 84. During the initial etching process, the metal blank remains substantially planar. After it has been etched to form the opening 90, including the channels 74, 84, the blank is stamped using a tool to bend the tooth substantially along the base 62. Thus, as seen in the top view of FIG. 4, each of the teeth 60 is angled outward from the plane or bowed surface of the cutting surface.

In other versions of the invention the angular offset of the cutting teeth may alternate within a single row. In yet other versions still other alternating patterns may be used, with some teeth having a first angular offset and other teeth having a second angular offset.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A grater, comprising:
    a cutting surface having a proximal end and a distal end;
    a first plurality of blades formed on the cutting surface, the first plurality of blades being positioned in a first row defining a first line, the first row being positioned between the proximal end and the distal end;
    a second plurality of blades formed on the cutting surface, the second plurality of blades being positioned in a second row adjacent the first row and defining a second line, the second row being positioned between the proximal end and the distal end;
    at least a portion of the first plurality of blades each being formed as a first tooth having a first base, first opposing sides, and a first sharpened edge, the sharpened edge having a first angular offset with respect to the first line; and
    at least a portion of the second plurality of blades each being formed as a second tooth having a second base, second opposing sides, and a second sharpened edge, the second sharpened edge having a second angular offset with respect to the first line, wherein the first angular offset is opposite to the second angular offset.

2. The grater of claim 1, wherein each of the first plurality of blades in the first row is formed with the first sharpened edge having the first angular offset, and further wherein each of the second plurality of blades in the second row is formed with the second sharpened edge having the second angular offset.

3. The grater of claim 2, further comprising:
    an additional plurality of rows, each of the additional plurality of rows being formed from an additional plurality of first teeth or an additional plurality of second teeth, wherein adjacent ones of the additional plurality of rows alternatingly comprise the first teeth or the second teeth.

4. The grater of claim 3, wherein one of the first opposing sides of each first tooth is longer than the other of the first opposing sides, and further wherein one of the second opposing sides of each second tooth is longer than the other of the second opposing sides.

5. The grater of claim 3, wherein the magnitude of the first angular offset is substantially equal to the magnitude of the second angular offset.

6. The grater of claim 3, wherein the first angular offset is at least approximately 20 degrees above the first line, and wherein the second angular offset is at least approximately 20 degrees below the second line.

7. The grater of claim 6, wherein the first line is parallel to the second line.

8. The grater of claim 6, wherein the first angular offset is at least approximately 30 degrees above the first line, and wherein the second angular offset is at least approximately 30 degrees below the second line.

9. The grater of claim 6, wherein the cutting surface is substantially planar.

10. The grater of claim 6, wherein each first tooth and each second tooth is bent outward from the cutting surface substantially at the base.

11. The grater of claim 6, further comprising a handle extending away from the proximal end of the cutting surface.

12. The grater of claim 1, further comprising:
    one or more additional cutting surfaces attached to the cutting surface to form an interior space; and
    a handle secured to the proximal end of the cutting surface and the one or more additional cutting surfaces.

13. The grater of claim 12, wherein the cutting surface and the one or more additional cutting surfaces define a base, the cutting surface and the one or more additional cutting surfaces being inclined upwardly and inwardly from the base toward the handle.

14. The grater of claim 1, wherein the cutting surface is produced by the method of:
    forming a plurality of openings in a metal blank; and
    stamping the metal blanks to form the plurality of first teeth and the plurality of second teeth, each of the first teeth and the second teeth being positioned within one of the plurality of openings.

15. The grater of claim 14, wherein the step of forming the plurality of openings comprises etching the metal blank.

16. The grater of claim 14, wherein the step of forming the plurality of openings comprises stamping the metal blank.

* * * * *